United States Patent [19]

Kar et al.

[11] Patent Number: 4,869,329
[45] Date of Patent: Sep. 26, 1989

[54] ROCK BIT INSERT

[75] Inventors: Naresh J. Kar, Westminster; Thomas W. Oldham, Mission Viejo, both of Calif.

[73] Assignee: Smith International, Inc., Houston, Tex.

[21] Appl. No.: 239,162

[22] Filed: Aug. 31, 1988

Related U.S. Application Data

[63] Continuation-in-part of Ser. No. 34,967, Apr. 6, 1987, abandoned.

[51] Int. Cl.⁴ .............................................. E21B 10/52
[52] U.S. Cl. .................................... 175/57; 76/108 A; 175/410
[58] Field of Search ............... 175/410, 57; 76/101 A, 76/101 R, 108 R, 108 A

[56] References Cited

U.S. PATENT DOCUMENTS

| | | |
|---|---|---|
| 2,687,875 | 8/1954 | Morlan et al. |
| 2,731,710 | 1/1956 | Lucas et al. |
| 3,581,835 | 6/1971 | Stebley ................................. 175/409 |
| 4,211,508 | 7/1980 | Dill et al. ............................. 407/120 |
| 4,674,365 | 6/1987 | Reed ................................. 76/101 R |

OTHER PUBLICATIONS

Cutter, et al.; *Correlation of the Mechanical Properties of WC-Co. with Drilling Performance in Hard Formations*, Jul. 1982, pp. 77-79.

*Primary Examiner*—William P. Neuder
*Attorney, Agent, or Firm*—Robert M. Vargo

[57] ABSTRACT

A new and improved tungsten carbide insert for rock bits is disclosed, in which the inserts are subject to extended vibratory tumbling in order to increase their fracture toughness. More specifically the vibratory finishing or tumbling of the inserts has been increased from a typical time of 30-60 minutes to time periods of at least 90 minutes and preferably a minimum of 225 minutes. A marked improvement in toughness is obtained by this process because the size and distribution of surface flaws of the inserts were greatly reduced, and because the surface hardness of the inserts was increased, thereby resulting in an increase in the stress required to cause fracture, and a consequent increase in resistance to breakage.

6 Claims, 2 Drawing Sheets

ROCK BIT INSERT

CROSS-REFERENCE TO RELATED APPLICATION

This application is a continuation-in-part of co-pending application Serial Number 034,967, filed on Apr. 6, 1987, now abandoned.

BACKGROUND OF THE INVENTION

1. Field of the Invention

The present invention relates generally to rock bits for drilling oil wells and more particularly to improving the toughness of sintered tungsten carbide or polycrystalline diamond inserts used as the cutting elements in rock bits.

2. Description of the Prior Art

This invention involves an improvement over powder metallurgy composite materials of the type disclosed in U.S. Pat. No. 2,731,710. This type comprises grains of relatively hard abrasion resistant material, such as tungsten carbide, and a binder material, such as a cobalt alloy, for binding the grains together. Such composite material, which is also referred to as a cemented carbide is widely used for cutting tools as the cutting elements. These cutting elements are commonly known as inserts and are utilized in rolling cutter drill bits such as shown in U.S. Pat. No. 2,687,875, for use in drilling oil and gas wells.

While tungsten carbide with a cobalt alloy bindeer has been the standard composite material for use in inserts in the drill bit manufacturing industry for the past 30 years, this material suffers from a shortcoming. More particularly, excessive wear and breakage of inserts, reduces the useful life of the rock bits. Insert wear is often attributable to the failure of the cobalt binder to hold the tungsten carbide grains together under the relatively high compressive loads applied to the drill bit during drilling operations. Life of drill bit inserts formed of conventional cemented carbide material is substantially affected also by the lack of adequate fracture toughness and resistance to fatigue crack growth of the inserts made with a cobalt binder.

Thus, the rock bit designer is forced to make tradeoffs in selection of carbide grades, to balance breakage with wear. In rock formations where excessive breakage of inserts occurs, the designer is forced to select carbide grades with higher cobalt content, of consequently lower hardness and wear resistance with slightly increased fracture toughness. Thus, up to now, high hardness and wear resistance of inserts coupled with high fracture toughness did not appear possible.

The prior art has used means to increase conformance of the insert hole dimensions to the size and shape of inserts, to reduce tendency for insert loss and breakage caused by inserts physically being rocked during loading and then being pulled out of bits. U.S. Pat. No. 4,211,508 discloses a concept of roughening the surface finish of inserts to improve retention and consequently reduce insert loss. U.S. Pat. No. 3,581,835 discloses means for molding a polygonal shaped carbide with at least 12 sides, and prehoning the sintered article to an inward taper. This teaching uses a prehoning step in lieu of conventional grinding techniques, before tumbling and pressing into holes.

Our invention follows conventional insert manufacturing steps followed in a method disclosed that enhances the hardness, toughness, breakage resistance and strength all concurrently, as will become clear from this disclosure. The conventional insert manufacturing steps used in our industry are described here for reference. Insert manufacture typically consists of mixing blends of tungsten carbide, cobalt powders, wax and lubricants such as acetone or heptane in high energy ball mills or attritor type mills. The grade powder blends may sometimes be cast into ingots with wax, further crushed and blended in v-type blenders to ensure mixing. The process powder is then pressed into desired forms using molds/dies. The powder compacts are then sintered in a furnace cycle, the initially includes a dewax cycle followed by sintering to a liquid-phase region. Sintered parts are sometimes subjected to a further hot-isostatic pressure (HIP) treatment for further densification of the compact. Alternatively, the sintering and HIP cycles may be combined into a single sinter-HIP process. Inserts made in the described manner are then generally ground in a close tolerance operation to obtain accurate diameters and eliminate any concavity present. Thereafter, inserts are generally tumbled in an abrasive medium for a limited time of 15 to 30 minutes, to remove any scale, residue of tray coatings or surface oxidation present and to smooth sharp corners. This practice of insert manufacture has generally been followed by all insert manufacturers for downhole tools.

Extensive research efforts have been made to study the metallurgical characteristics and nature of this essentially two-phase composite material. A study carried out at Terratek laboratories is cited here for reference.

Experiments in this research effort at TerraTek Laboratories in Salt Lake City, Utah, apparently induced residual compressive stresses by ball milling inserts, to produce a marginal increase in apparent fracture toughness, as measured in the laboratory test. This was attributed to the inducement of residual compressive stresses during ball milling that acted against tensile loads used in testing.

Although these concepts have improved results somewhat, insert breakage remains as one of the biggest problems in affecting drill bit life.

SUMMARY OF THE INVENTION

Previous work by the inventors had been conducted to improve the toughness of inserts by concentrating on decreasing the size and population of internal flaws.

It was later realized that surface flaws were twice as detrimental as internal flaws in reducing fracture toughness. Therefore, efforts were made to reduce such surface flaws.

One solution was to tumble the inserts for extended time periods. This was accomplished by placing the inserts into a vibratory finisher with water and a small amount of detergent. In the vibratory finisher the inserts randomly impact and rub against each other thereby reducing the surface flaws which act as stress risers. Typically such inserts tumbled for 90 to 225 minutes, much longer than the 30 to 60 minutes used in conventional insert manufacture.

The present invention has drastically improved the toughness of inserts by greatly extending the vibratory tumbling or finishing operations thereon.

It has been found that by greatly increasing the tumbling time of the inserts, not only was there an increase in surface hardness but a reduction of the size and distribution of surface flaws was found which resulted in an increase in the stress required to cause fracture.

In various series of laboratory drop tower tests conducted, the incidence of fracture in tungsten carbide inserts decreased dramatically. Subsequent field tests on rock bits utilizing such inserts showed reduced insert breakage under severe drilling conditions.

DETAILED DESCRIPTION OF THE PREFERRED EMBODIMENT

Figure 1:
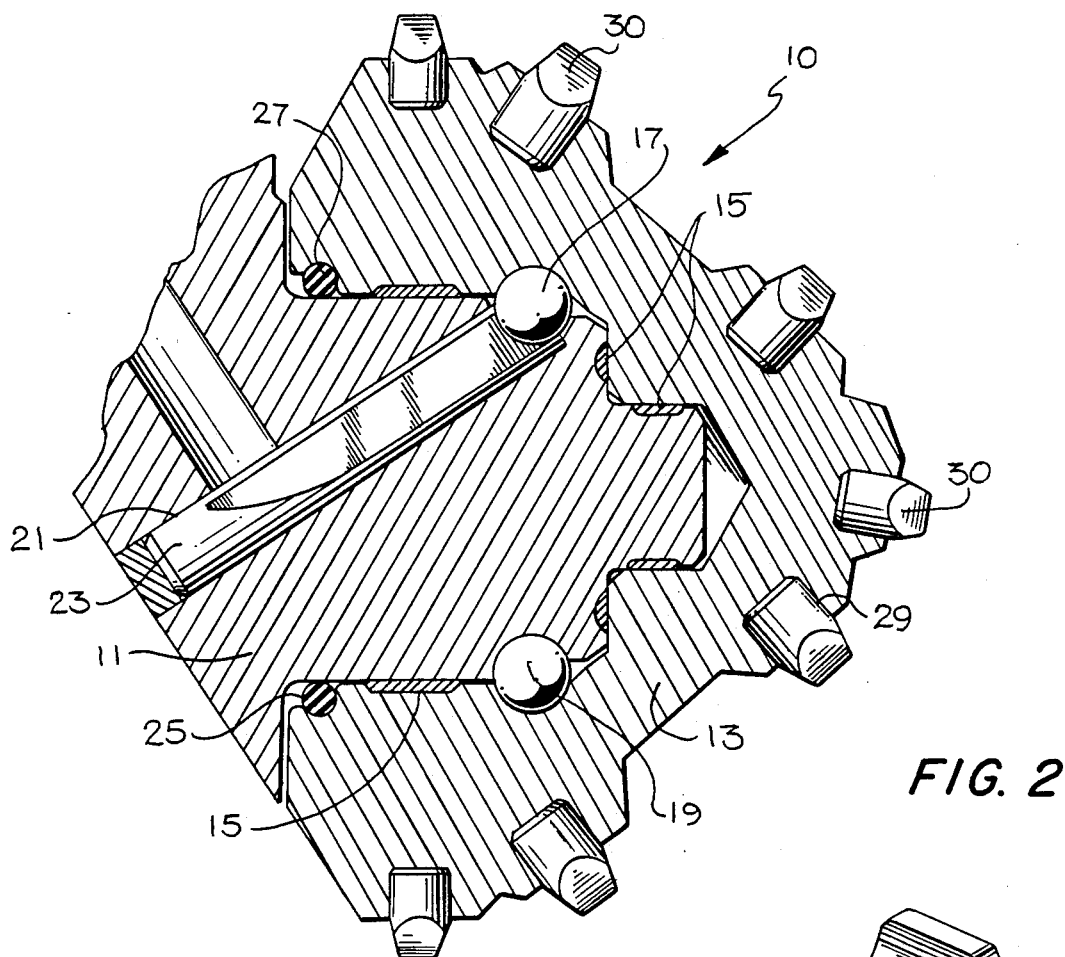
FIG. 1 is a sectional view of a rock bit cutter utilizing tungsten-carbide inserts.

Referring to the drawings, FIG. 1 illustrates a lower portion of a rock bit leg assembly, generally indicated by arrow 10. The leg assembly 10 includes a journal 11 for rotatively supporting a cone shaped cutter 13. A plurality of friction bearing pads 15 are provided at various locations on the journal 11 or inside the cutter 13. A plurality of ball bearings 17 are located within an annular raceway 19 formed between the journal 11 and the interior of the cutter 13. The ball bearings 17 function to retain the cutter 13 on the journal 11 during rotational operation. The ball bearings 17 are inserted into the raceway 19 through a bore 21 which, after all of the ball bearings are installed, is then closed by a plug 23. An o-ring seal 25 is located within an annular groove 27 formed within the cutter 13 to seal the lubricated bearing chamber from the exterior of the bit.

Figure 2:
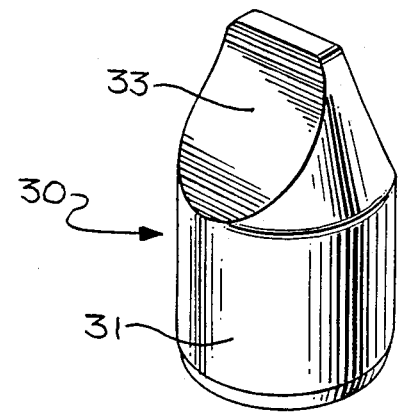
FIG. 2 is a perspective view of the type of insert that can be processed according to the present invention.

The cutter 13 also includes a plurality of bores 29 formed on the outer surface thereof for receiving a plurality of cutter inserts 30 preferably made of tungsten carbide or the like. As shown in FIG. 2 each insert 30 includes a cylindrical base 31 and a projected portion 33. The cylindrical base 31 of each insert 30 is adapted to be force fitted into a respective bore 29 of the cutter 13. The portion 33 which projects beyond the outer surface of the cutter 13 is in the shape of a chisel although other shapes such as a conical projection can be utilized.

In the preferred embodiment, the inserts 30 are made of sintered tungsten carbide bonded with cobalt, and are formed, sintered and ground in a conventional manner. The abrasion resistant material could also be a mixture of tungsten carbide, titanium carbide and tantulum carbide and the binder could also be a nickel-iron composition.

After the inserts 30 are formed, sintered and ground as disclosed earlier they are then placed within a vibratory or rotary tumbler. In addition to the plurality of inserts 30, a quantity of tungsten carbide balls or serrates is also placed within the tumbler. A quantity of grinding fluid, preferably water with a small amount of detergent, is also placed within the tumbler. During the vibratory or rotary motion of the tumbler the inserts randomly impact against each other and the tungsten carbide balls to polish the outer surfaces of the inserts 30.

In accordance with the present invention, the inserts 30 are tumbled for a period of not less than 90 minutes and preferably for at least 225 minutes.

It should be noted that various quantity mixtures of inserts and other balls and serrates can be used in addition to the amount and type of grinding fluid utilized. A more abrasive mixture would shorten the tumble time as compared to a less abrasive mixture.

Figure 3:
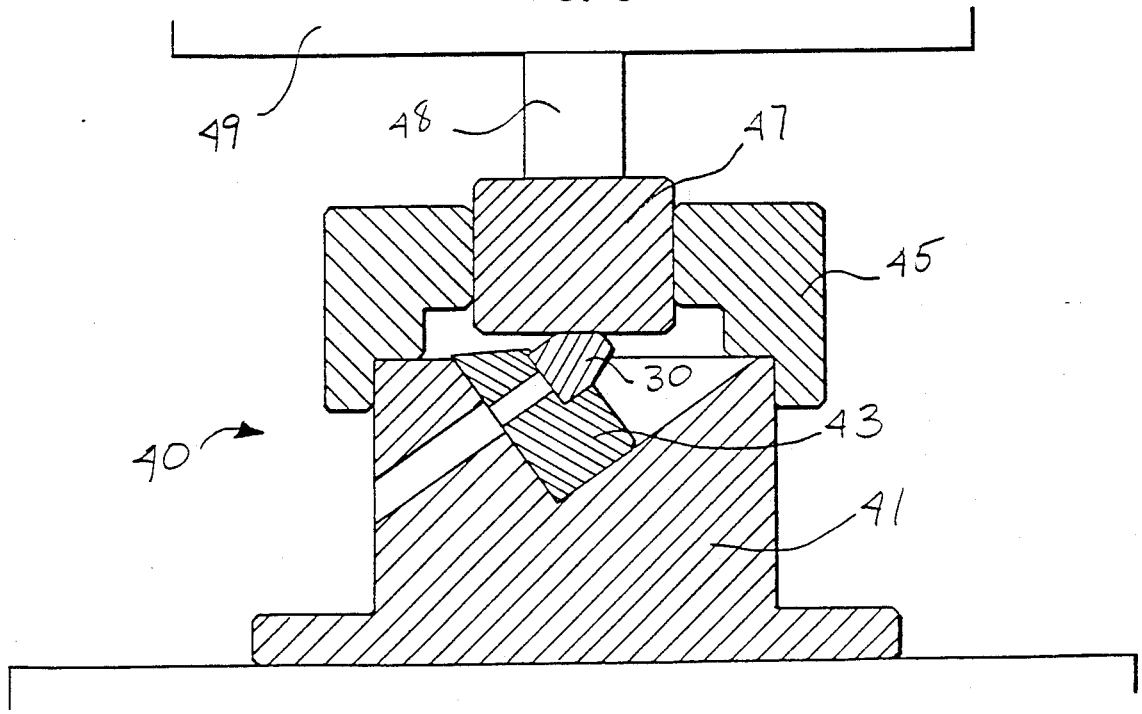
FIG. 3 is a sectional view of a typical drop tester.

FIG. 3 shows a typical drop tower machine 40 used for testing various batches of inserts tumbled for different periods of time. Each batch, represented by a datum point on the graph, consisted of approximately 25 inserts with the tumbling times ranging from 15 minutes to 225 minutes.

The drop tester 40 consists of a drop tower base 41 having a mounting block 43 located thereon. The mounting block 43 holds the insert 30 with the same tolerances as those found in a rock bit. A fixture 45 is mounted on the base 41 to guide an impact tool 47. A load cell 48 is provided to measure the energy of fracture although for this test purpose, a visual acceptance criteria was utilized to determine major material separation. Finally a drop weight 49 weighing 450 pounds was used to drop 18 inches onto the load cell 48, which, in turn, transferred this energy to the impact tool 47.

Figure 4:
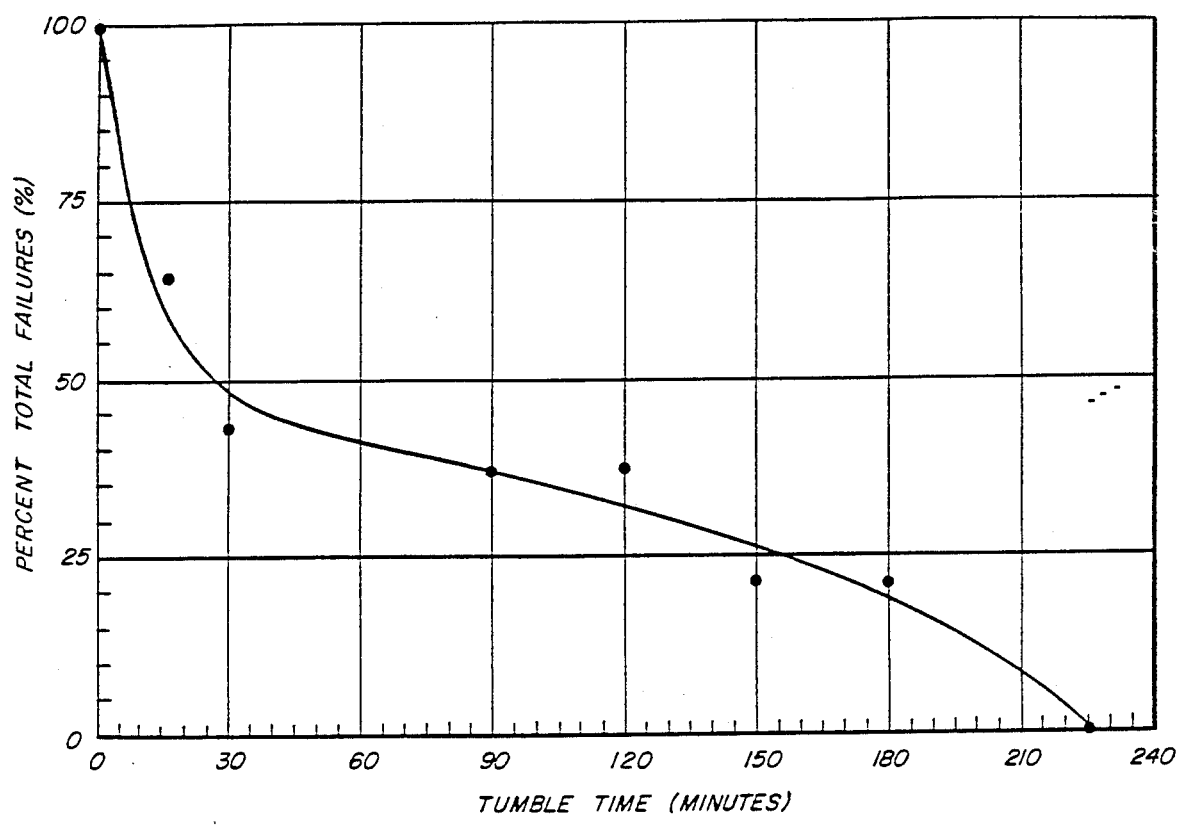
FIG. 4 is a graphical representation of an impact test plotting the percent total failures of inserts versus tumble time.

FIG. 4 shows the results of a test in which batches of approximately 25 inserts were respectively tumbled for 15, 30, 90, 120, 150, 180 and 225 minutes. The tumble time was plotted against percent total failure which is defined as the percentage of inserts within the specified test group which exhibited major material separation upon impact.

As can be seen, for the given mixture used in the tumbling, the amount of percentage failures for the batch of inserts tumbled 225 minutes was zero. This was the result of the synergistic effect of the conditions which changed the physical properties of the binder phase and the cermet: i.e., an increase in surface hardness; an increase of residual compressive stresses; and a reduction of surface flaws to a point where there are no scars or grinding pits.

As stated previously, the balls used in the test mentioned above were of the same grade of tungsten carbide as the inserts. If balls of a harder carbide grade or if a diamond grit were used, a shorter tumbling time can be utilized.

I claim:

1. A method of manufacturing inserts for rock bits comprising the steps of:
    forming said inserts out of a composite material comprising grains of relatively hard, abrasion resistant material and a binder material for binding the grains together, said inserts having outer surfaces;
    sintering said composite material in a furnace cycle;
    grinding said inserts to obtain accurate diameters; and
    polishing said insert surfaces by means of vibratory finishing or tumbling for a time period of at least 90 minutes.

2. The invention of claim 1 wherein said insert surfaces are polished for a time period of at least 225 minutes.

3. The invention of claim 1 wherein said polishing step is accomplished by placing the inserts into a container filled with a liquid and vibrating said container.

4. The invention of claim 1 wherein said polishing step is accomplished by placing the inserts into a container filled with a liquid and rotating said container.

5. The invention of claim 3 wherein said polishing step further includes placing a plurality of balls of similar material as said inserts in said container.

6. The invention of claim 4 wherein said polishing step further includes placing a plurality of balls of similar material as said inserts in said container.

* * * * *